(12) United States Patent
Rabin et al.

(10) Patent No.: US 11,520,807 B2
(45) Date of Patent: *Dec. 6, 2022

(54) MULTI-APPLICATION STATE NAVIGATION

(71) Applicant: MICROSOFT TECHNOLOGY LICENSING, LLC, Redmond, WA (US)

(72) Inventors: Jonathan Rabin, Herzliya (IL); Dikla Dotan-Cohen, Herzliya (IL); Daniel Avigdor, Barkan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/168,960

(22) Filed: Feb. 5, 2021

(65) Prior Publication Data

US 2021/0232599 A1    Jul. 29, 2021

Related U.S. Application Data

(63) Continuation of application No. 15/403,844, filed on Jan. 11, 2017, now Pat. No. 10,915,553.

(51) Int. Cl.
*H04L 9/40* (2022.01)
*G06F 16/27* (2019.01)
*G06F 16/951* (2019.01)
*G06F 9/54* (2006.01)
*G06F 9/46* (2006.01)

(52) U.S. Cl.
CPC .............. *G06F 16/273* (2019.01); *G06F 9/54* (2013.01); *G06F 16/951* (2019.01); *H04L 63/0428* (2013.01); *G06F 9/461* (2013.01)

(58) Field of Classification Search
CPC ........ G06F 16/273; G06F 16/951; G06F 9/54; G06F 9/461; H04L 63/0428
See application file for complete search history.

*Primary Examiner* — Nanci N Wong
(74) *Attorney, Agent, or Firm* — Shook, Hardy & Bacon, L.L.P.

(57) ABSTRACT

Technology for interoperability is disclosed by enabling the sharing of application state data for an application experience across computing devices, operating systems, applications, or locations. In one aspect, a secondary application shares encrypted state data along with a non-encrypted hint that describes the application experience reflected in the state data with a primary application. The primary application is then able to use the hint to determine that a user is interested in returning to the experience in the secondary application. The primary application then transfers the encrypted state data to the secondary application, which uses the state data to return the application to the application experience. A platform and an application programming interface (API) are provided for computer applications and services to store and retrieve application state data associated with an event.

20 Claims, 9 Drawing Sheets

MULTI-APPLICATION STATE NAVIGATION

CROSS-REFERENCE TO RELATED APPLICATIONS

This application is a continuation of U.S. application Ser. No. 15/403,844, titled "Multi-Application State Navigation," filed Jan. 11, 2017; which is hereby expressly incorporated by reference in its entirety.

BACKGROUND

On an average day, a person typically uses multiple computing devices and multiple applications across those devices. Often the person will move from one application to another, preferring one or the other based on a particular task the person is trying to complete, the location of the user (e.g., whether the user is at home or driving somewhere), or the experience the person is seeking. For example, the person might begin reading an email on their phone using a native email application only to continue reading and responding to it on a desktop computer using a different application. Similarly, a person may look for flights through a first travel application and then use a personal assistant application to look for flights at a different time.

But transitioning from one application to another is not seamless and often can be cumbersome, requiring the person to move the application data herself from one application to another and apply the data to the new application. Applications often have no way to know what actions the user took in a different application. For instance, in the above example, the user may need to manually transfer reservation information to the personal assistant or from the personal assistant back to the travel application, for example, to let the two applications know that travel is planned.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Technology described in the present disclosure improves navigation between applications and application states by collecting and sharing application state information at key points during an application experience. The technology can allow a user to return directly to a previously experienced application state without having to re-enter data used to create the desired application experience in the first place. A platform and application programming interface (API) are provided for a primary application to receive and store event records from secondary applications.

The event record includes state data and a hint describing the application state of the secondary application at a point in the time the event occurred. In one aspect, the state data is encrypted and readable only by the secondary application that generated the state data. The hint is readable by the primary application and can used to identify a state the user wishes to return to, for example, in response to a user query. The event that triggers creation of an event record can be defined by a trigger criterion for the event. When the trigger criterion is met, the event record is created. Exemplary events include closing an application, completing a task, entering new data, displaying an updated user interface, and such. The trigger criteria allow a computing device to determine the event happened or is about to. For example, the trigger criteria for the "close application event" can be receiving an instruction to close the application. In this situation, the event record would be created and communicated to the primary application before the secondary application is closed.

The platform may be cloud based and the event records may be shared across client computing devices (sometimes referred to herein as "user devices") over the Internet. For example, the event records may be preserved in a cloud-based data store associated with the user. Using the API, applications and services running on clients with an Internet connection can access the data store, to store or retrieve the state data. The platform and API enable the sharing of the event records across nearly any application or service that may be used for a particular task, including applications or services developed using different computer programming languages and/or operating on different types of user devices, or user devices running different operating systems. Thus, for example a user can begin a task on one device in one secondary application and return to the computer experience later through a second instance of the secondary application on a second device using information stored in the event record. For example, a user could check flights through a travel application (e.g., a secondary application) causing several flight options to be presented. As is understood, the user may have provided a destination city, departure city, dates of travel, and other relevant application information in order for the travel application to generate the flight options interface. When the user closes the travel application an event record is created capturing state information at the time of the travel application is closed and a hint describing the state of the secondary application. In this case, the hint could describe the travel parameters. The event record can then be used at a later point to allow the travel application to show the flight options previously presented (possibly updated to reflect changes in cost, availability, or other information that may have changed).

In one aspect, the user's desire to return to the flight options interface in the travel application is determined by a primary application, such as a personal assistant application. For example, the user could query the personal assistant about travel arrangements researched previously. The personal assistant could use the hint in the event record to determine that the user's previous application experience associated with the event record might be relevant to the query and output for selection by the user an option to "see the flights previously presented in the travel application" as a search result. Upon the user selecting this search result, the primary application can pass the encrypted state information to the travel application. The travel application can then recreate the desired flight options interface following information in the state record, which the travel application is capable of decrypting, having encrypted it in the first place.

BRIEF DESCRIPTION OF THE DRAWINGS

Aspects of the disclosure are described in detail below with reference to the attached drawing figures, wherein.

DETAILED DESCRIPTION

Figure 1:
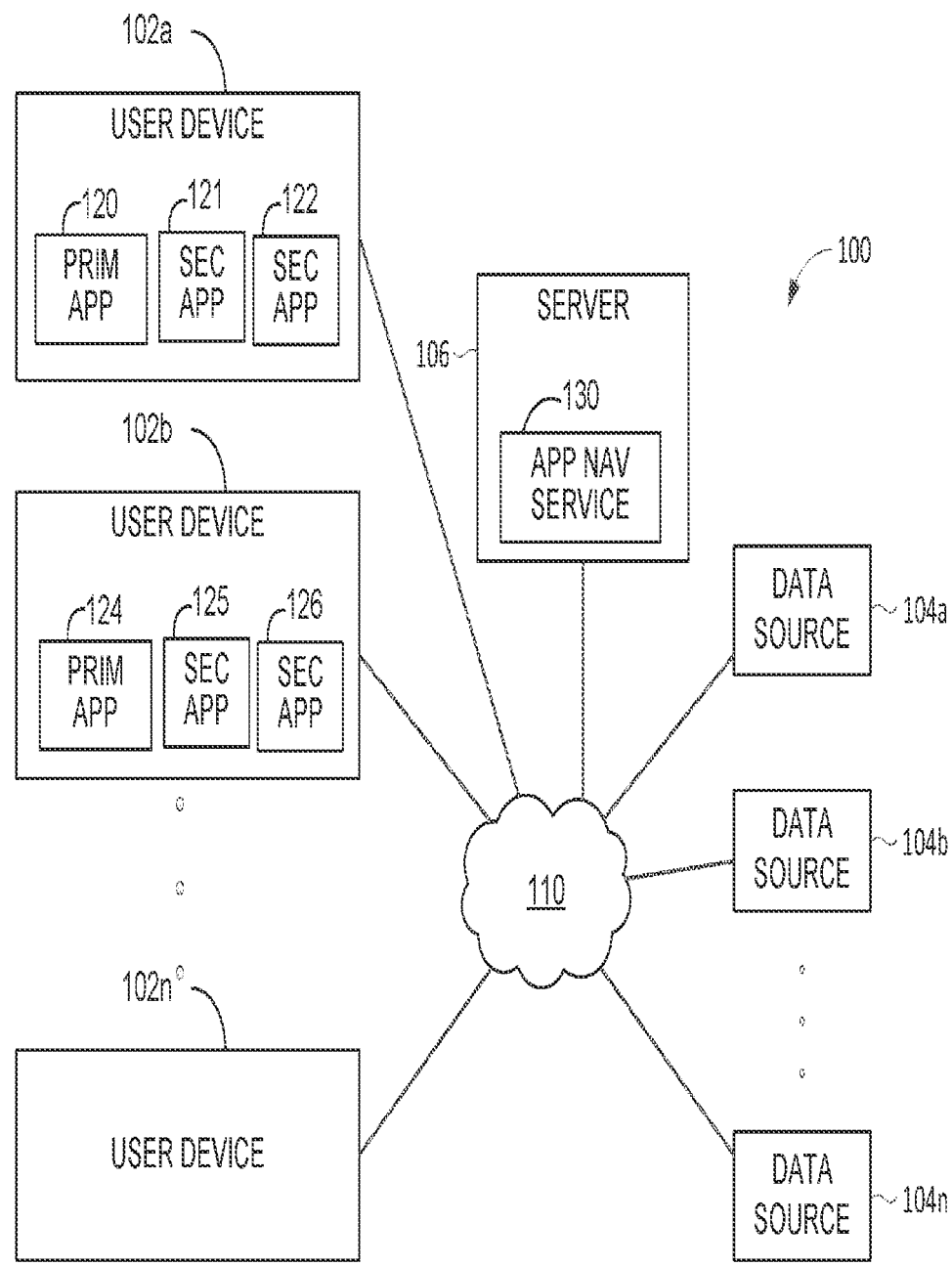
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Technology described in the present disclosure improves navigation between applications and application states by collecting and sharing application state information at key points during an application experience. The technology allows a user to return directly to an application experience without having to re-enter data used to create the desired application experience in the first place. A platform and application programming interface (API) are provided for a primary application to receive and store event records from secondary applications.

As used herein, an application experience comprises information communicated to the user by an application at a point in time. The data can be communicated visually, audibly, or through some other means. As used herein, the application experience generated by an application is limited to outputs provided by the application. For example, outputs provided by a device platform, such as a clock, various notifications, signal strength indicators, Wi-Fi connectivity indicators, battery charge, and other visual controls are not part of the application experience. Similarly, outputs provided by other applications running contemporaneously are also excluded from the application experience provided by a secondary application. The outputs generated by other applications may be part of an application experience associated with the other applications.

The data communicated as part of an application experience can be independent or dependent. Independent data will not change based on context and remains constant when the application experience is recreated at a later point in time. The dependent data can change over time and can be different when the application experience is recreated at a later point in time. The dependent data can be produced, at least in part, in response to the independent data. When recreating a requested application experience, the dependent data may be refreshed. For example, the cost for flights might change. We recreated an application experience in a travel application, the current cost for flights could be provided. In this example, the flight cost is dependent data, while the flight parameters (e.g., departure airport, destination airport) are independent data.

In aspects, a primary application is responsible for collecting event records that describe application experiences from one or more applications and may provide an API for this purpose. The secondary applications generate event records and communicate the event records to the primary application. The secondary applications may be provided access to the event records and consumed them for the purpose of returning the user to desired application experience in the secondary application or some other application including the primary application. The primary application can also generate its own event records that can be stored and used to return a user to an experience within the primary application. As mentioned, other applications may be given access to the event records, so a secondary application could return the user to a primary application in some implementations described herein.

The event record memorializes an application experience in a way the application experience can be understood by other applications and used by the application creating the event record to recreate the application experience. The event record can include a non-encrypted event description that is consumable by the primary application to understand the application experience. The event record can also include encrypted state information that is not consumable by the primary application, but can be returned to the secondary application by the primary application and consumed by the secondary application in order to recreate an application experience consistent with the event.

The event description can include a hint and an image of a secondary application's user interface at a point in time associated with the event. The hint can be a group of keywords, snippets taken from the second application's user interface, or other information that describes event. The hint or information extracted from the hint can be added to an index that allows the primary application to determine that the event is relevant to a subsequent user action. The index record can also include information identifying the application from which the event record was received and other contextual information about the state of the user or the user's device when the event record was created. The image can be a thumbnail of the secondary application's user interface.

The circumstances that trigger creation of an event record can be defined by a trigger criterion for the event. When the trigger criterion is met, the event record is created. Exemplary events include closing an application, completing a task, entering new data, displaying an updated user interface, and such. The trigger criteria allow a computing device to determine the event happened or is about to. For example, the trigger criteria for the "close application event" can be receiving an instruction to close the application. In this situation, the event record would be created and communicated to the primary application before the secondary application is closed.

The technology described herein allows a primary application to help the user return to a secondary application to start a task, complete a previously initiated task, find information, and such. In particular, the primary application can pass state information to the secondary application that allows the secondary application to provide the application experience the user presently wants to revisit. The state information may remain encrypted and only usable by the secondary application.

The platform for collecting event records may be cloud based and the event records may be shared across client computing devices (sometimes referred to herein as "user devices") over the Internet. For example, the event records may be preserved in a cloud-based data store associated with the user. Using the API, applications and services running on clients with an Internet connection can access the data store, to store or retrieve the state data. The platform and API enable the sharing of the event records across nearly any application or service, including applications or services developed using different computer programming languages and/or operating on different types of user devices, or user devices running different operating systems. Thus, for example a user can begin a task on one device in one secondary application and return to the computer experience later through a primary application on a second device using information stored in the event record. For example, a user could check flights through a travel application (e.g., a secondary application) causing several flight options to be presented. As is understood, the user may have provided a destination city, departure city, dates of travel, and other relevant information in order for the travel application to generate the flight options interface. When the user closes the travel application an event record is created capturing state information at the time of the travel application is closed and a hint describing state. In this case, the hint could describe the travel parameters (e.g., departure city, flight dates). The event record can then be used at a future point to show the flight options interface previously presented (possibly updated to reflect changes in cost, availability, or other information that may have changed).

In one aspect, the user's desire to return to the flight options interface in the travel application is determined by a primary application, such as a personal assistant application. For example, the user could query the personal assistant about travel arrangements researched previously. The personal assistant could use the hint in the event record to determine that the user's previous application experience associated with the event record might be relevant to the query and suggest "see the flights previously presented in the travel application" as a search result. Upon the user selecting this search result, the primary application can pass the encrypted state information to the travel application. The travel application can then recreate the desired flight options interface following information in the state record, which the travel application is capable of decrypting, having encrypted it in the first place.

As the progression of technology continues its course, new, diverse, and often proprietary systems, content, applications, and services are continuously developed and released to users. These advances often provide advantages such as improved security, specialization, efficiency, aesthetic design, additional features, and other improvements or benefits, for example. This is why some users might prefer one travel application for making hotel reservations and another for making flight reservations. The result is that a user can have multiple applications that are capable of performing the same tasks and it can be difficult for the user to remember which application was previously used to complete a task or start a task. It is a challenging technological problem to enable interoperability among these technologies, such as the sharing of application state information between applications, because these technologies typically are not designed to interoperate and even may be developed without awareness of the other technologies for which interoperability is desired or needed. For example, state information for a first application may be formatted in a way that it is not understood by a second application. Addressing this problem typically requires significant coordination among developers and manufacturers; modifications or compromises in design, which may result in a slightly inferior product; and additional development time which can delay a products entry to market. So most of the time, applications are unable to be aware of what tasks the user may be doing in other applications. The present technology provides a hint that describes what the user was doing in the secondary application so the primary application can make use of the event record. At the same time, the state information does not need to be understood by the primary application, and may even be encrypted to protect user information, proprietary application information, or for some other reason.

In some aspects, the event record may include information that corresponds to a state of an application-provided experience, which may be associated with a user session of the application, service, or user computing device, during which the user starts a task. A task may include nearly any job, function, or operation that may be performed by or carried out using a computing device or facilitated with a computing device. By way of example, tasks may include checking or reading email, playing music or video, reading or writing a document, browsing the Internet, browsing or engaging with a social media platform, services provided by apps operating on a user device (e.g., a navigation/map app, a weather monitoring or forecast app, a calendar or scheduling app, etc.) monitoring or altering the user's environment such as adjusting lighting, heating or cooling the air, humidity, operating a vehicle or machine, or other actions that may be facilitated or carried out for a user by a computing device.

Different tasks will have different hints and different state information in the event record. By way of example the state data associated with a task of playing a song, via a music-playing application or service operating on a user device, might include information about the song being played including a track number, or title, or other song identifier; a source of the song (such as a file path, online address, streaming music account, or similar information specifying a computer-accessible location of the song file such that the song may be potentially accessed by another application, service, or user device); previous song(s) played; number of times this song has been listened to; a playlist of upcoming songs queued for play back; offset information indicating the present location of the song as it is played; user playback settings; such as visualization settings; audio equalization configurations; headphone or speaker configurations; volume; communication network connection(s) information; other settings, options, parameters, configurations or user preferences related to the task of playing or listening to music with the user device; information about user interactivity during the song playback, such as other applications accessed or websites browsed to, for example; or other contextual information associated with the user, the user device, or the playing of the song on the user device. All of this state information can be used to return an entertainment application to state the user previously experienced. For instance, a user listening to her favorite song in the car as she arrives home can turn off the car, go into her house, turn on her home audio system, and resume listening to the song at about the same point in the song where she left off when she turned off the car. Further, a primary application can know that she was listening to a particular song in the car and respond to a query such as, "resume last song," by opening the media application with the most recent event record having a hint about "playing music" or similar and passing the state data to the media application. In this instance, the user does not need to open the media application, find the song, or take any other steps.

Access Management

As mentioned, event records may be accessed by multiple applications in order to return a user to desired experience. The records can be stored locally, remotely, or both locally and remotely. Access to the data store containing event records may be managed by an access controller, which enables a user to manage access permissions or specify levels of access to the event record in the data store. Thus, by way of example, access may be managed based on the task; the particular application or service requesting access to the event record; the type of application or service or other property of the application or service; the user device or type of user device that is seeking access to the data store (e.g., a phone, tablet, laptop, television, etc.); location of the device; time or date; the duration of time for which a user device, application, or service has accessed the event record (e.g., a user may want to set a time limit of 2 days for which a hotel television can seek access to the event record for watching a movie and provide new event records); the number of previous accesses or requests to access the event records (or the rate of access or requests to access) by an application, service, or device; the amount of event records that have previously been shared with the application, service, or user device; whether the user owns the device or if the device is being used by the user temporarily; whether the user device, application, or service has been provided access to the event record data store previously, and in some instances the level of access preciously provided (In some aspects, upon requesting access to the user's the event record data store by a device not previously recognized, the user may be prompted to provide authentication); a degree of confidence that the application, service, or device is legitimately authorized to receive the event records; whether other user devices, applications, or services that may be associated with the user are concurrently seeking access (or accessing) to the same the event record or to other event records on the user's data store; network connection or communication properties associated with the user device; other properties associated with or nearly any other criteria related to the application, service, or user device. Accordingly, it is contemplated that a user may be provided a broad degree of control regarding how and to what level the event record data store is accessed or the event records are shared and collected. In one aspect, the access controller includes a set of access parameters that specify the rules, conditions, permissions, or other logic for managing accessing the event record data store and/or updating or sharing the event records. In some instances, at least some access parameters may be configured to default settings.

A user may set or modify the access parameters through a user interface (UI) associated with the access controller. In one aspect, the UI comprises a webpage accessible over the Internet. In another aspect, the UI is provided via an application or service (including an Operating System service) on a client device, or may be part of an application or service associated with the particular task. (For example, a settings feature in the user's email application may include functionality enabling the user to modify or specify those access parameters associated with the task of email.) In one aspect, the UI comprises a dashboard or control panel enabling the user to manage access parameters and/or visualize aspects of her data sharing, such as real time instances of access or historical information indicating previous instances of sharing of the event records to applications, services, or user devices.

As mentioned, some of the aspects described herein may be carried out by a personal digital assistant (PDA) application or service, sometimes referred to as a "virtual assistant", which may be implemented as one or more computer applications, services, or routines, such as an app running on a mobile device or the cloud.

Example Operating Environment

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user computing devices, such as user devices 102a and 102b through 102n; a number of data sources, such as data sources 104a and 104b through 104n; server 106; and network 110. It should be understood that environment 100 shown in FIG. 1 is an example of one suitable operating environment. Each of the components shown in FIG. 1 may be implemented via any type of computing device, such as computing device 900 described in connection to FIG. 9, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102a and 102b through 102n can be client user devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 9 herein. By way of example and not limitation, a user device may be embodied as a personal computer (PC), a laptop computer, a mobile or mobile device, a smartphone, a tablet computer, a smart watch, a wearable computer, a personal digital assistant (PDA) device, a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized meter or measuring device, an appliance, a consumer electronic device, a workstation, or any combination of these delineated devices, a combination of these devices, or any other suitable computer device.

Data sources 104a and 104b through 104n may comprise data sources and/or data systems, which are configured to make data available to any of the various constituents of operating environment 100, or system 200 described in connection to FIG. 2. (For instance, in one aspect, one or more data sources 104a through 104n provide (or make available for accessing) application data to one or more applications running on the user devices.) Data sources 104a and 104b through 104n may be discrete from user devices 102a and 102b through 102n and server 106 or may be incorporated and/or integrated into at least one of those components. In one aspect, one or more of data sources 104a through 104n comprise one or more sensors, which may be integrated into or associated with one or more of the user device(s) 102a, 102b, or 102n or server 106. Examples of sensed user data made available by data sources 104a through 104n are described further in connection to user-data collection component 210 of FIG. 2. The data sources 104a and 104b through 104n can provide usage data and preferences that are used to determine the relevance of various hints in response to a user query. For example, past usage patterns may indicate that a user wants to complete a task via a favorite application instead of being taken to a webpage. Past states from the favorite application that may be relevant to a query can then be suggested with more confidence.

Operating environment 100 also includes several applications and an application navigation service 130. The user device 102a includes primary application 120, secondary application 121, and secondary application 122. The user device 102b includes primary application 124, secondary application 125, and secondary application 126. As used herein, a primary application receives event records from secondary applications and distributes state information to secondary applications. The primary application can have other functions or be solely dedicated to facilitating user navigation between applications. In one aspect the primary application is a virtual personal assistant. The secondary applications generate event records and communicate the event records to the primary application. The secondary applications may be provided access to the event records and consumed them for the purpose of returning the user to desired application experience in the secondary application or some other application including the primary application. The primary application can also generate its own event records that can be stored and used to return a user to an experience within the primary application. As mentioned, other applications may be given access to the event records, so a secondary application could return the user to a primary application in some implementations described herein. Secondary applications can include entertainment applications, map applications, exercise applications, shopping applications, productivity applications, and such. A single application can have instances on different user devices. For example, the secondary application 121 in the secondary application 125 could both be instances of the same entertainment application. As mentioned, the user devices could be associated with the same user in which case instances of the same application could have access to the same data on both devices.

The application navigation service 130 can act as a central repository for event records received from applications. The application navigation service 130 can serve multiple users and platforms. The application navigation service 130 can work with a primary application to store hints, images, application data, user data, or other information received from secondary applications and provide these items to the primary application at an appropriate time. Application navigation service 130 can provide a uniform experience across user devices by synchronizing application event indexes located on various user devices or providing access to a common index via a network connection. The records can be access by the primary applications and also the secondary applications in some instances.

Figure 2:
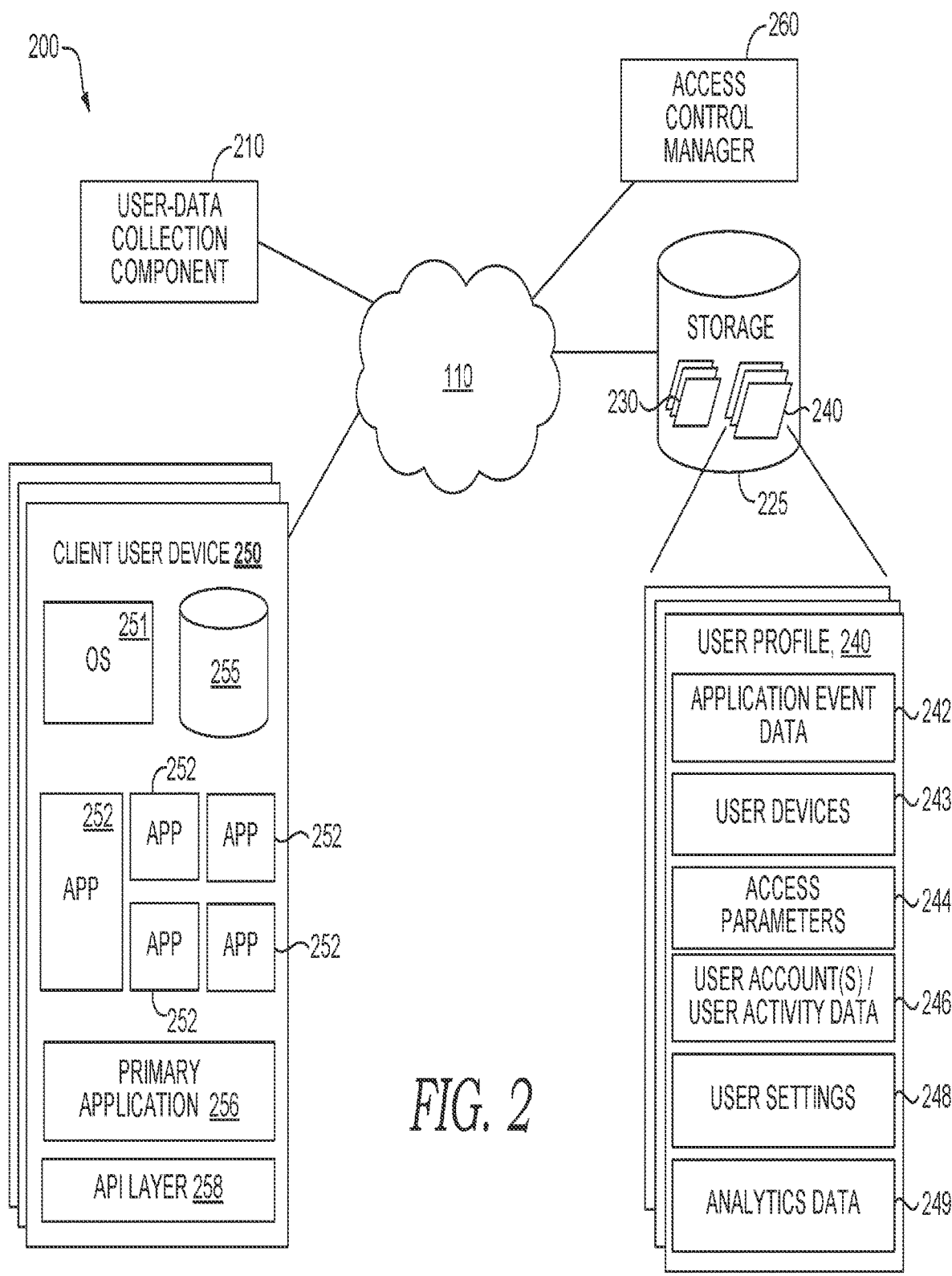
FIG. 2 is a diagram depicting an example computing architecture suitable for implementing aspects of the present disclosure.

Operating environment 100 can be utilized to implement one or more of the components of system 200, described in FIG. 2, including components for collecting user data; monitoring or determining user tasks on one or more applications, user activity and events, user patterns (e.g., (usage, behavior, or activity patterns), user preferences, context data, or related information to facilitate sharing application event records or to otherwise provide an improved user experience; generating personalized content; and/or presenting notifications and related content to users. Operating environment 100 also can be utilized for implementing aspects of methods 600, 700, or 800 described subsequently.

Computing System Architecture

Referring now to FIG. 2, with FIG. 1, a block diagram is provided showing aspects of an example computing system architecture suitable for facilitating navigation between applications and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which facilitates communication between components of system 200. The components of system 200 include user-data collection component 210, access control manager 260, one or more client user device(s) 250, and storage 225. User-data collection component 210, access control manager 260, and subcomponents of client user device(s) 250 including application(s) 252, operating system 251, primary application 256, and API layer 258 may be embodied as a set of compiled computer instructions or functions, program modules, computer software services, or an arrangement of processes carried out on one or more computer systems, such as computing device 900 described in connection to FIG. 9, for example. The components of system 200 facilitate the collection and use of application event data in order to help a user switch between applications and return to desired application states. In particular, the primary application 256 may receive event records from applications or services, provide search results that include a link to other applications at a state previously experienced by the user, and forward state information to secondary application. The secondary applications then use the state data to recreate a requested experience for the user.

In one aspect, the functions performed by components of system 200 are associated with one or more personal assistant applications, services, or routines. In one aspect, the primary application 256 is a personal assistant application. In particular, such applications, services, or routines may operate on one or more user devices (such as user device 102*a*), servers (such as server 106), may be distributed across one or more user devices and servers, or be implemented in the cloud. Moreover, in some aspects, these components of system 200 (including components 210, 260, 256, and 258) may be distributed across a network, including one or more servers (such as server 106) and/or client devices (such as user device 102*a*), in the cloud, or may reside on a user device, such as user device 102*a*. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects described herein can be performed, at least in part, by one or more hardware logic components. For example, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects functionality of these components can be shared or distributed across other components.

Continuing with FIG. 2, user-data collection component 210 is generally responsible for accessing or receiving (and in some cases also identifying) user data from one or more data sources, such as data sources 104*a* and 104*b* through 104*n* of FIG. 1. The collected data can be analyzed to facilitate services that use the technology described herein. For example, the data describing application usage could be analyzed to build usage patterns that can, in turn, be used to determine that one secondary application is likely more relevant to the user than another application in a particular context. The user data can be used to help determine user interests or usage patterns, which can be used to determine when a user is preparing to perform a task and which application the user is statistically likely to use based on previous user patterns. In addition to using data about a single user, patterns derived from a group of similar users, can be used to predict application usage patterns. These patterns can be used to determine the relevance of an application in response to a search query or make a proactive suggestion (meaning not in response to a user request) to the user that a particular application and associated application state may be of interest.

In some aspects, user-data collection component 210 may be employed to facilitate the accumulation of user data of a particular user (or in some cases, a plurality of users including crowd-sourced data) for primary application 256, API layer 258, access control manager 260, or other components or subcomponents of system 200. The data may be received (or accessed), and optionally accumulated, reformatted and/or combined, by user-data collection component 210 and stored in one or more data stores such as storage 225, where it may be available to the components or subcomponents of system 200. For example, the user data may be stored in or associated with a user profile 240, as described herein. In some aspects, any personally identifying data (i.e., user data that specifically identifies particular users) is either not uploaded from the one or more data sources with the user data, is not permanently stored, and/or is not made available to the components or subcomponents of system 200.

By way of example and not limitation, user data may include data that is sensed or determined from one or more sensors (referred to herein as sensor data), such as location information of mobile device(s), mobile-device data (such as device state, charging data, date/time, configurations or settings, or other information derived from a mobile device), user-activity information (for example: app usage data; information regarding applications and services utilized or tasks performed on a user device and related contextual information such as usage time(s), files accessed, application configurations, online activity; searches; voice data such as automatic speech recognition; activity logs; communications data including calls, texts, instant messages, and emails; website posts; other user data associated with communication events; other user interactions with a user device, etc.) including user activity that occurs over more than one user device, user history, session logs, application data, contacts data, calendar and schedule data, notification data, social network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personalization-related (e.g., "personal assistant" or "virtual assistant") application or service), home-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, other network connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, cellular network, or IP address data), and nearly any other source of data that may be sensed or determined as described herein.

User data can be received by user-data collection component 210 from one or more sensors and/or computing devices associated with a user. While it is contemplated that the user data is processed, by the sensors or other components not shown, for interpretability by user-data collection component 210, aspects described herein do not limit the user data to processed data and may include raw data. In some respects, user data may be provided in user-data streams or signals. A "user signal" can be a feed or stream of user data from a corresponding data source. For instance, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data source. In some aspects, user-data collection component 210 receives or accesses user-related data continuously, periodically, or as needed.

Example system 200 includes one or more client user device(s) 250. Client user device 250 may comprise a user computing device such as computing device 900 described in connection to FIG. 9, and may be embodied as a user device 102a through 102n described in FIG. 1. Some aspects of this disclosure contemplate that client user device(s) 250 may comprise a set of client user devices (e.g., 102a through 102n) associated with a user, such as one or more mobile devices (e.g., smartphone, tablet, laptop, etc.) used by the user, desktop computer, game/home-entertainment system, smart TV, vehicle computer system, smart thermostat, home-automation computing device, or other examples of user devices 102a through 102n described in connection to FIG. 1.

As shown in example system 200, user client device 250 includes operating system 251, local storage 255, one or more secondary applications 252, a primary application 256, and API layer 258. It is contemplated that some client user devices 250 may include other components not shown, such as communication components, power-related components, or other hardware and/or software components typically found on user computing devices. Further, it will be understood that the components 251, 255, 252, 256, and 258 illustrated in FIG. 2 are exemplary in nature and in number and should not be construed as limiting.

Operating system 251 comprises the system software that manages and computer hardware or software resources of client user device 250 and provides common services for computer programs such as applications 252, primary application 256, and API layer 258. Operating system 251 may be a single-task or multi-task operating system. By way of example, examples of operating systems 251 may include Microsoft Windows, Microsoft Windows Mobile, Google Android, Google Chrome, Apple iOS, Apple OSX, Linux, Nokia Symbian, Blackberry OS, etc. Where example system 200 includes more than one, client user devices 250, it is contemplated that in some aspects operating system 251 may be a different operating system for at least some of the client user devices 250. For example, a set of client user devices associated with a user may include a smartphone running Google Android, an iPod touch running Apple iOS, and a laptop running Microsoft Windows 10.

Client user device 250 includes one or more secondary applications 252. The secondary applications 252 can provide event records to the primary application 256 and receive state information that can be used to return the user to a previous application experience within the secondary application 252. Secondary applications 252 comprise one or more computer programs, software services, or routines that operate on client user device 250. In some aspects, secondary applications 252 may be standalone computer programs that run on client user device 250 and are supported by operating system 251. For example, application 252 may comprise an app installed by the user, such as a music-playing application, a video player, or a web browser. Some applications 252 may also be integrated into operating system 251. For instance, secondary application 252 may include services or routines that are built into the operating system, such as (without limitation) configurations, user preferences, communications services, user interface services, or security settings.

In some aspects, an application 252 may be utilized by a user to carry out or facilitate a task. For example, an application 252 may be used for checking or reading email, other communication (e.g., instant messaging), playing music or video, reading or writing a document, browsing the Internet, browsing or engaging with a social media platform, navigation/geography, monitoring a weather forecast, calendar or scheduling, monitoring or altering the user's environment such as adjusting lighting, heating or cooling the air, humidity, operating a vehicle or machine, or other applications, services, or tasks carried out for the user. It is also contemplated that a client user device 250 may include more than one secondary application 252 for handling a particular task, such as more than one web browser or music player. Additionally, different client user devices 250 may include different secondary applications 252 for handling tasks; for example, a smartphone client user device may include a native email application 252, and a laptop client user device may include a Microsoft Outlook email application 252. In some instances, an application 252 may have user preferences, such as settings, options, parameters, or configurations, which may be associated with carrying out a task or may be used for configuring the functionality of the application 252.

Figure 3:
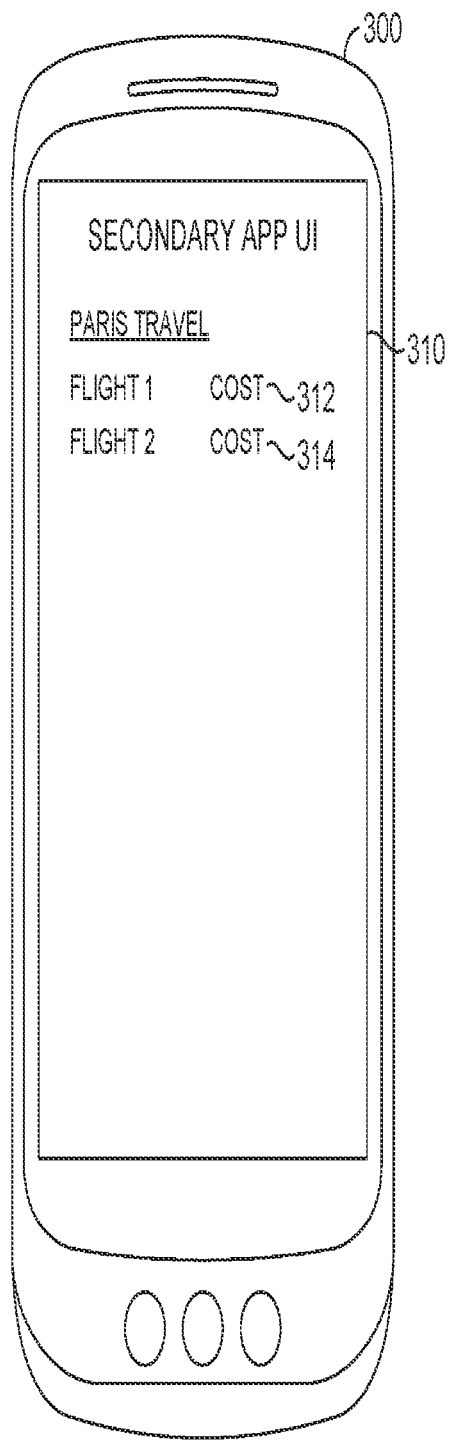
FIG. 3 illustratively depicts a secondary interface, in accordance with an aspect of the present disclosure.

Turning now to FIG. 3, an application experience provided by a secondary application is depicted. In this example, the secondary application is a travel application that allows the user to purchase airline tickets. A computing device 300 is shown displaying a user interface 310 generated by the secondary application. The user interface 310 depicts a first flight and associated cost 312 and a second flight and associated cost 314 for travel to Paris. An actual application could include the date of travel, airlines, and other information. In order to generate the application experience depicted in the user interface 310, the entered travel information, such as a departure city, destination city, dates of travel, numbers of passengers traveling, and possibly other information.

As mentioned, the user interface 310 depicts an application experience. An application experience comprises data communicated to the user by a secondary application at a point in time. The data can be communicated visually, audibly, or through some other means. For example, listening to a song through an application that is not displaying anything can constitute an application experience. As used herein, the application experience generated by an application is limited to outputs provided by the application. For example, outputs provided by a device platform, such as a clock, various notifications, signal strength indicators, Wi-Fi connectivity indicators, battery charge, and other visual controls are not part of the application experience. Similarly, outputs provided by other applications running contemporaneously are also excluded from the application experience provided by a secondary application and captured in an event record. The outputs generated by other applications may be part of a computer experience associated with the other applications.

The data communicated as part of an application experience can be independent or dependent. Independent data will not change based on context and remain constant when the application experience is recreated at a later point in time. The dependent data can change over time and can be different when the application experience is recreated at a later point in time. The dependent data can be produced, at least in part, in response to the independent data. In the example shown, the destination city, departure city, and travel dates are examples of independent data within the application experience. The available flights and flight costs may change and, therefore, are dependent data within the application experience. As has been explained, the technology described herein recreates application experiences using state data from an event record. If the application experience shown in FIG. 3 were to be recreated, the list of available flights and associated costs could be recalculated using the destination city, departure city, and traveled dates as input. The available flights and costs could be updated. Showing the application experience with updated dependent data still constitutes recreating the application experience for purposes of this disclosure.

Other application experiences (not shown) include only independent data. For example, a media application may play a song. The song is independent data as it will not change over time. Similarly, a progress point in the media presentation, which can be a parameter that defines an application experience, also will not change since the application experience is a snap shot in time. Even if the user continues the media presentation, the particular event record will reflect the progress made at whatever time the event record was created. Subsequent event records could be associated with different progress points. For example, a user may stop viewing a movie before the movie concludes. A first event record created by the media application could include the movie title and a progress point, along with a day in time when the user stopped watching the movie. A user could continue watching the movie and again stop before the movie is concluded, causing a second event record to be created by the media application. The second event record would include a different progress point from the first event record. This would give a primary application two event records to choose from if the user asked to continue watching the movie, though the most recently created event record would likely be more relevant. Nevertheless, both event records could remain usable and in some scenarios the first record may be more relevant. For example, in response to a request from the user to continue watching the movie from where she left off on Tuesday, the first event record would be more relevant if the first event record was associated with Tuesday and the second event record was associated with Wednesday.

The secondary application can generate event records upon satisfaction of a trigger criteria. Different secondary applications can have different trigger criteria. The trigger criteria can be parameterized by users, by application developers, or by others. In one aspect, the trigger criteria is a threshold amount of time elapsing with the application running. For example, an event record could be created every five minutes if the threshold amount time is five minutes. In another example, the trigger criteria is receiving instructions to close the application, navigate away from the application, open the new application, or some other instruction. Accordingly, secondary applications could generate an event record every time the application closes. In another example, the trigger criteria is providing an updated interface in response to a new user input. Using the travel application as an example, a new event record could be created every time new flights are provided in response to an updated user input, such as changing a date of travel, airport, preferred airlines, or some other parameter.

In the case of the travel application shown in FIG. 3, an event record could constitute a hint describing the travel search, state information usable by the application to recreate the application experience depicted in interface 310, and a thumbnail depicting the interface 310. The hint could include the travel parameters, such as the destination city Paris, travel dates, the name of the application, and the time and date the event record was created. The state information could be a deep link to the travel application usable to recreate the application experience. As mentioned, recreating the application experience might include rerunning a search for available flights. The state information can be encrypted with a key known only to the travel application. The event record can be communicated through an API or some other mechanism to the primary application 256.

Figure 4:
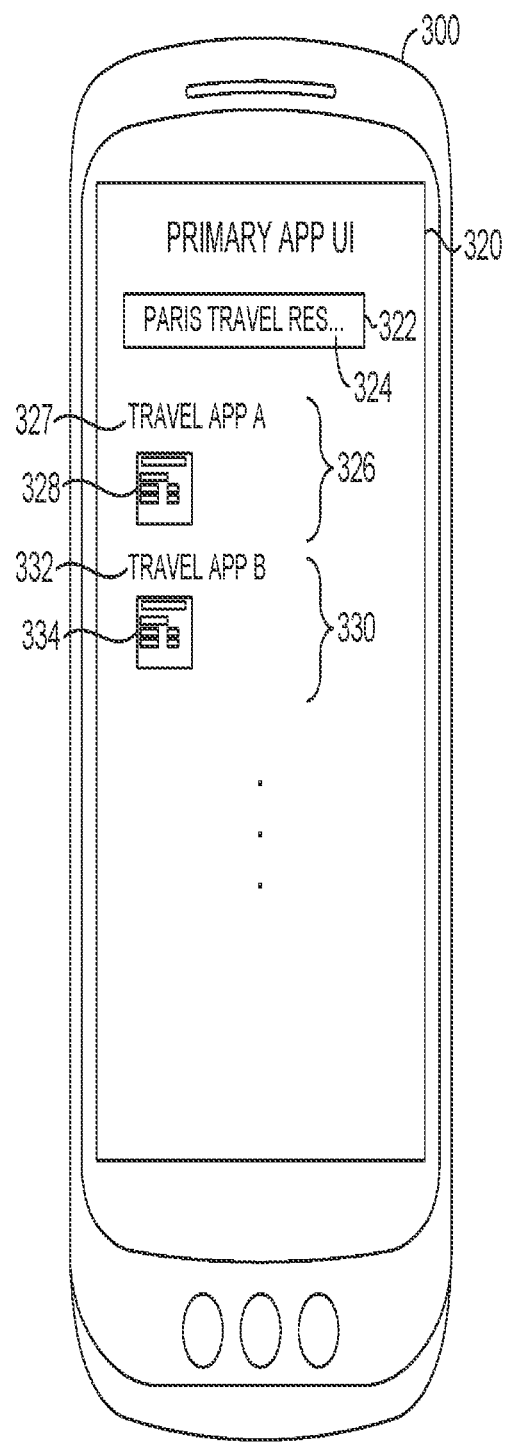
FIG. 4 illustratively depicts a primary interface showing a search result that can be navigated to the secondary application, in accordance with an aspect of the present disclosure.
Figure 5:
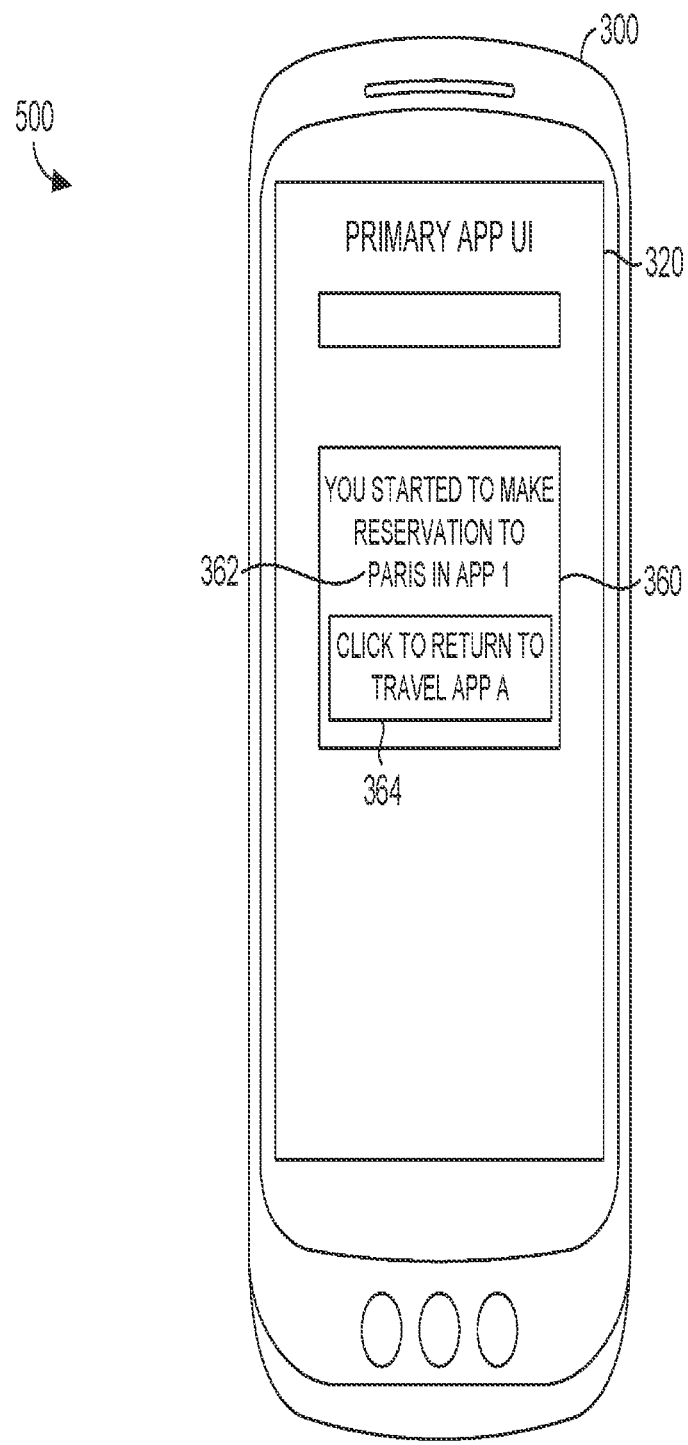
FIG. 5 illustratively depicts a primary interface showing a navigation suggestion to the secondary application, in accordance with an aspect of the present disclosure.

Primary application 256 is generally responsible for receiving event records from secondary applications and returning state information from an event record to a secondary application when needed. The primary application 256 can store event records locally in data store 255, remotely in application event data 242, or in some other location or combination of locations. The primary application can also perform functions or tasks described above with reference to the secondary applications 252. In other words, the primary application 256 need not be dedicated to collecting, searching, and distributing event records. In one aspect, the primary application is a personal assistant that receive queries and return application experiences as a search result as shown in FIG. 4 (optionally along with other types of search results, such as web pages). The personal assistant can also analyze the user context and determine that an application experience is relevant to a task the user is preparing to complete. In this situation, the personal assistant application can provide an interface inviting the user to return to the previous application experience, as shown in FIG. 5.

Turning now to FIG. 4, a search result interface showing a link to an application experience is shown, according to an aspect of the technology described herein. FIG. 4 shows a search interface that is part of a primary application user interface 320. The user interface 320 includes a search box 322 showing a query "Paris travel reservations" 324. The query could have been entered verbatim by the user or suggested in some fashion by the primary application, including by auto complete or a suggested query.

The search interface shows search results for two different application experiences. The first search result 326 describes an application experience on travel application A and includes a thumbnail 328 showing an interface of the travel application A. The first search result 326 also communicates the name 327 of the travel application A to the user. By selecting the first search result 326 the travel application A could be automatically opened to the application experience described in the first search result 326. In order to accomplish this, state information associated with the event record from which the first search result 326 was generated could be passed to the travel application A.

The search interface also includes a second search result showing an application experience from travel application B and includes a thumbnail 334 showing an interface of the travel application B. The second search result 330 also communicates the name 332 of the travel application B to the user. By selecting the second search result 330 the travel application B could be automatically opened to the application experience described in the second search result 330. In order to accomplish this, state information associated with the event record from which the second search result 330 was generated could be passed to the travel application B. Additional results (not) shown on interface 320 could link to webpages, documents, additional application experiences, or other information. The search results can include results for different application experiences within the same application. For example, the search results could show two results for the travel application A.

In addition to a search results interface, a contextual suggestion interface, such as shown in FIG. 5, can invite the user to return to an application experience that the present device/application context suggests the user may have an interest in. The user's interest is detected by one or more methods of pattern recognition. In other words, the user is determined to have an interest in an application when the context of the computing device fits a pattern similar to a context when the application was used previously.

In FIG. 5, a contextual suggestion 360 is presented to the user. As mentioned, the contextual suggestion 360 can be triggered when the context of the computing device, including user actions, suggests the user is going to work on a task to which the application experience may be relevant. For example, a user may be surfing webpages showing destinations in Paris. This could trigger a suggestion to return to the travel application A where the user previously investigated flight options. The contextual suggestion 360 includes a description 362 of an application experience the user previously experienced. In this case, the description 362 lets the user know that the user previously started to make travel reservations to Paris in the travel application A. The contextual suggestion 360 also includes a selectable control 364. Upon selection of the selectable control 364, the travel application a can be opened to the application experience described. The primary application can communicate state information to the travel application A in order to facilitate recreation of the application experience.

In order to present relevant opportunities for a user to return to a previously experienced state in a secondary application, the primary application 256 can collect and monitor user data to generate search results or a contextual suggestion, as described above. For example, aspects of primary application 256 monitor user data received from user-data collection component 210, which may include data associated with a client user device 250 or related information including data associated with an application 252 installed or running on a client device 250, or other user data that may be used for facilitating determining context data. As described previously, context data may include user context or user preferences associated with an application experience. Thus in some instances, context data may be associated with an application 252 performing a task. The context data may also include other contextual information associated with a user session of application 252 or client user device 250. In some aspects, primary application 256 monitors or determines context data according to a schema 230, as further described herein.

In some aspects, primary application 256 extracts context data and other contextual information from user data received from user-data collection component 210. For example, primary application 256 may receive user data, parse the data, in some instances, and identify and extract context features or variables according to a schema. In some aspects, primary application 256 extracts information via screen scraping (or screen grabbing), keylogging, scanning memory, monitoring or analysis of operating system activity, or scanning communication(s). (Thus, in some aspects, optical character recognition may be utilized. In some aspects, semantic analysis may be performed, which may use a semantic knowledge base.) In some aspects, the context data features or variables are stored as a related set of contextual information associated with a user session or task being carried out via an application 252 or client user device 250. In some aspects, primary application 256 (or access control manager 260) may determine interpretive data from received user data. Interpretive data corresponds to data utilized by these or other components (or subcomponents) of system 200 to interpret user data. For example, interpretive data can be used to provide additional context to user data. For example, in some aspects interpretive data comprises statistical data, inferences, or determinations made from raw user data or other sensed user data. Moreover, it is contemplated that aspects primary application 256 or other components of system 200 may use user data and/or user data in combination with interpretive data for carrying out the objectives of the subcomponents described herein.

In various aspects, primary application 256 may be embodied as a component on a client user device 250, as shown in example system 200, such as a stand-alone application or service, as part of a stand-alone application or service, or as part of operating system 251. Alternatively, or in addition, primary application 256, or aspects thereof, may be incorporated into an application 252. Primary application 256 may also be embodied as a cloud-based service or as a distributed service that operates in the cloud and on one or more client user devices 250.

In some aspect, the storing or retrieval of event data is carried out by API layer 258, as described below. In some aspects, a request for event data may be received by primary application 256 from other secondary applications 252. In some aspects, primary application 256 provides the event data to API layer 258 (or calls API layer 258). As described below, API layer 258 facilitates communicating the event data to the user's data store, such as application event data 242 in user profile 240 on storage 225.

Similarly, an event record may be received from a secondary application upon satisfaction of criteria triggering generation of the event record. The trigger can be detecting that the user is no longer using the secondary application, no longer using the device, or is about to turn the device off. For example, upon detecting the user has set down their phone, turns off her screen, logs off/out, etc., the event record may be generated and communicated to primary application 256 and then stored in application data 242 of storage 225. Similarly, upon detecting that the user has arrived at work, at home, or other locations where the user has previously switched client user devices 250, applications 252, (as may occur when the user arrives to work or arrives home), then event records can be generated and collected to recreate the application experience in a second user session, such as a second user session on the user's work computer (a second client user device 250). In one aspect, the detection may be facilitated using one or more sensors.

In some aspects, event records may include a date-time stamp (or value) indicating the time at which the event record was received by primary application 256. The date-time stamp may be used to determine the most recent event record for an application, as well as an indication of the staleness of the event record. The staleness may be useful where a significant amount of time has passed between user session that event record. In such a circumstance, it may be assumed that recreating the application experience from an older user session may not be desired. Accordingly, in some aspects, where a significant amount of time (e.g., more than 8 weeks, for example) has elapsed from when event data was preserved, the user may be prompted regarding whether to delete the record. In another aspect, stale data is deleted when a threshold time has passed.

In some aspects, only the most recent event is preserved in application event data 242. The event data may be stored in a user profile associated with the user, such as in application event data component 242 of user profile 240 in storage 225. Alternatively or in additional, event data may be stored locally on a client user device 250 in location storage 255. Primary application 256 may access API layer 258 to facilitate formatting, transferring, and/or storing or retrieving event data to or from a data store, such as application event data 242 or user profile 240 in storage 225.

API layer 258 is generally responsible for connecting a primary application 256 and/or a secondary application 252 on client user device 250 to a data store associated with the user, such as user profile 240 in storage 225 (or for facilitating access by an application 252 or other component operating on a client user device 250, such as primary application 256, to event data 242 in the data store). The term access, as in accessing data, is used broadly herein and may include without limitation, reading, writing, receiving, requesting, communicating, transferring and/or other similar operations. (In some aspects, the level or degree of access to the event data 242 or other data in storage 225 (or local storage 255) is controlled by access control manager 260, and may be specified by a set of access parameters, as further described herein.)

In some aspects, API layer 258 may facilitate formatting, requesting, communicating or transferring, and/or storing application data in the user's data store (e.g., in event data component 242 of user profile 240). API layer 258 may receive event data to be stored in user profile 240 (e.g., the user' data store) from primary application 256, such as may occur when an event record is received. API layer 258 may also or alternatively receive a request for event data stored in the user profile 240 by primary application 256 (or directly from an application 252 on client user device 250).

In some aspects, API layer 258 exposes a simple to use API on top of common communication channels and protocols such as Representational State Transfer (REST) over HTTP(S), Simple Object Access Protocol (SOAP), or similar protocol. Data may be sent or received as JSON, CSV, RSS, XML, msgpack, Protocol Buffers, or other suitable data formats, for example, and may be structured based in part on a schema. In this way, API layer 258 may be accessible from nearly any application 252 (including primary application 256) running on top of an operating system 251 or platform an nearly any client user device 250, so long as Internet connectivity is available (or another suitable communication means, including, for example, direct or peer-to-peer communication channels).

In some aspects, access to application data 242, or other information stored in the user's data store such as user profile 240, is controlled by access control manager 260. API layer 258 also may facilitate user authentication via the access control manager 260, and/or may access data store 225 (or local data store 255, in some aspects) according to a level of access permission provided by access control manager. For instance, API layer 258 may access application data 242 through the access control manager 260. Or more specifically, access control manager 260 may receive a request from API layer 258 and provide access according to permissions.

Access control manager 260 is generally responsible for controlling or managing access to the user's data (including application event data), which may be stored in a data store associated with the user, such as in user profile 240 in cloud-based storage 225 (or in local storage 255, in some aspects). In some aspects, access control manager is responsible for performing authentication and/or authorization (such as read and/or write access or other levels of authority), as described herein. Access control manager 260 generally enables a user to manage access permissions or specify levels of access to the user's information. Some aspects provide a granular control over access according to a set of access parameters 244. In this way, access control manager 260 may ensure that the user information remains private and the user is able to control who/what, when, where, or how the information can be accessed. The access control manager 260 can grant access to one or more applications, such as the primary application 256, to application event data or portions of application event data. In addition to user preferences, the preferences of entities providing the secondary or primary applications can be managed. For example, secondary application providers may agree to share event data on a condition that the event data is not accessible by a competitor's application. Accordingly, the access control manager 260 may provide access to only the application information that a requesting application is authorized to access. The access control manager 260 can also limit access to only the information that the requesting application can use. For example, a first response may provide access to a hint index. In response to an additional request, the access control manager 260 can provide access to state data associated with a selected hint.

Access control manager 260 may be cloud-based or may be distributed across the cloud (or server side) and client-side or system 200. In the distributed aspects, some aspects of access control manager 260 may be performed by client user device(s) 250. As described previously, in some aspects, access control manager 260 may receive a request to access a user's information (for example a request to receive or update event data to the user's data store) from API layer 258. In response to the request, access control manager 260 may utilize a set of access parameters 244 associated with the user to determine the level of access to be provided. The access parameters 244 generally specify rules, conditions, permissions, or other logic for managing access the user's information, such as requesting, uploading, or sharing the event data 242. In some aspects, a user may set or modify access parameters 244 through a user interface. At least some access parameters 244 also may be configured to default settings or values, in some instances. Alternatively, or in addition, some access parameters may be learned or inferred from the user or from other users (e.g., through crowd sourcing).

Some aspects of access control manager 260 include information about the client user devices 250 associated with a user, which may be stored as one or more data records in user devices 243 of user profile 240. In some aspects, a user may declare or register her client user device(s) 250 (or applications 252) with access control manager 260. For example, a user may provide information that identifies a particular client user device via a user interface, or may optionally register a user device upon first accessing application data 242 or access control manager 260 (and in some instances following authentication by access control manager 260). Similarly, a user may log into an account via the client user device 250, install an application or service that includes device registration functionality on the client user device 250, connecting to an online service that interrogates client user device 250, or otherwise providing information about the client user device to access control manager 260 or a related application or service. In some aspects devices that sign into an account associated with the user, such as a Microsoft® account or Net Passport, email account, social network, or the like, are identified and determined to be associated with the user. In some aspects, a client user device 250 may register (or confirm registration) with access control manager 260 upon first requesting or receiving application event data, and based on access parameters 244 the client user device 250 may be required to periodically re-confirm registration.

In one aspect, access control manager 260 (and/or primary application 256, in some aspects such as aspects where primary application 256 is distributed or cloud-based) includes a device identifier component (not shown) for identifying user devices associated with a particular user. In some aspects, the device identifier identifies a set of one or more devices by monitoring user data for user-device related information. The device features of a particular client user device 250 may be used by to identify the client user device 250 or to classify the particular device type. Some aspects may use as many device features as are available, able to be determined, or needed for the identification and/or classification.

Example system 200 also includes storage 225 and local storage 255. Storage 225 (and in some instances local storage 255) generally stores information including data, computer instructions (e.g., software program instructions, routines, or services), logic, profiles, and/or schemas used in aspects described herein. In an aspect, storage 225 and/or local storage 255 comprises a data store (or computer data memory). Further, although depicted as a single data store component, storage 225 may be embodied as one or more data stores and may include aspects of local storage 255. As shown in example system 200, storage 225 comprises a cloud-based data store, and local storage 255 comprises a data store on a client user device 250.

Storage 225 includes a set of one or more schemas 230. Aspects of schemas 230 specify aspects of application event data. Thus, the application data (which may include user preferences) associated with a particular application, hint, state, user-interface image, experience, or other content, may be defined according to a schema. For example, where the task is reading email, an email schema may specify specific aspects of application experience data, such as an identification of the current email message that is being presented to the user, an offset indicating the position within the email message that the user has read to or viewed (or based on the portion of the message that has been presented), and an email account identifier or data source of the email message. In some aspects, the schema may specify additional data to store such as preferences or other parameters associated with the application, service, or application experience. For example, specific settings or preferences associated with the application or service (e.g., the font or text size for the email example), the time that the user engaged in the task (such as a date-time stamp or series of date-time stamps, which may also be used for determining how long ago the user engaged in that particular task which may indicate that the experience could be out-of-date or stale, and unlikely to be of interest to the user), an amount of time the user has viewed the message or engaged in the task, information about the device, application, and/or service that the user is using to view the message, etc. Each type of task or application category could have its own schema for collecting event information.

Returning to FIG. 2, storage 225 also includes one or more user profiles 240; an example aspect of which is illustratively provided in FIG. 2. Example user profile 240 includes information associated with a particular user including, among other things, application data 242, user devices 243, access parameters 244, user accounts/user activity data 246, user settings 248, and analytics data 249. In one aspect, user profile 240 may be associated with a Microsoft Account, Google Account (or Google Drive), Apple iCloud, or an online cloud-based storage account. Application event data 242 is described above.

User devices 243 includes information about client user devices 250 associated with or used by a user, as described previously. Access parameters 244 is described previously and generally includes rules, conditions, permissions, or other logic for managing access a user's information in the user profile, and in particular to event data 242, such as requesting, uploading, or sharing the application event data 242.

User account(s) and activity data 246 generally includes user data collected from user-data collection component 210 (which in some cases may include crowd-sourced data that is relevant to the particular user), and may be used for accessing content corresponding to an application experience (e.g., a user's email account information and credentials enabling an email message to be accessed, identified, and loaded into a second user session), or may be used for determining context data about the user (e.g., user behavior patterns) or user session. User account(s) and activity data 246 may include data associated with user accounts, such as online accounts (e.g. email, social media), Microsoft® Net passport, user data relating to user accounts such as user emails, texts, instant messages, calls, and other communications; social network accounts and data, such as news feeds; online activity; and calendars, appointments, application data, or the like. Some aspects of user account(s) and activity data 246 may store information across one or more databases, knowledge graphs, or data structures.

User settings 248 generally include user settings regarding user preferences other than access parameters associated with an application state sharing system and services. For example, a user may specify a frequency at which application event data is preserved during a first user session. As another example, a user may specify whether to preserve application data based on properties of communications networks (e.g., a user may elect not to share application data when the user is roaming and the user may incur expensive data charges).

Analytics data 249 generally includes information derived from user data, and may include personalized content for presentation to the user, such as recommendations or suggestions, as described previously with reference to FIGS. 4 and 5. The analytics data may be used to determine the relevance of various search results, including those linking to other applications and application experiences. For example, the analytics data can include preferred applications for various tasks, where the preferences are derived by analyzing application usage data for the user.

Figure 6:
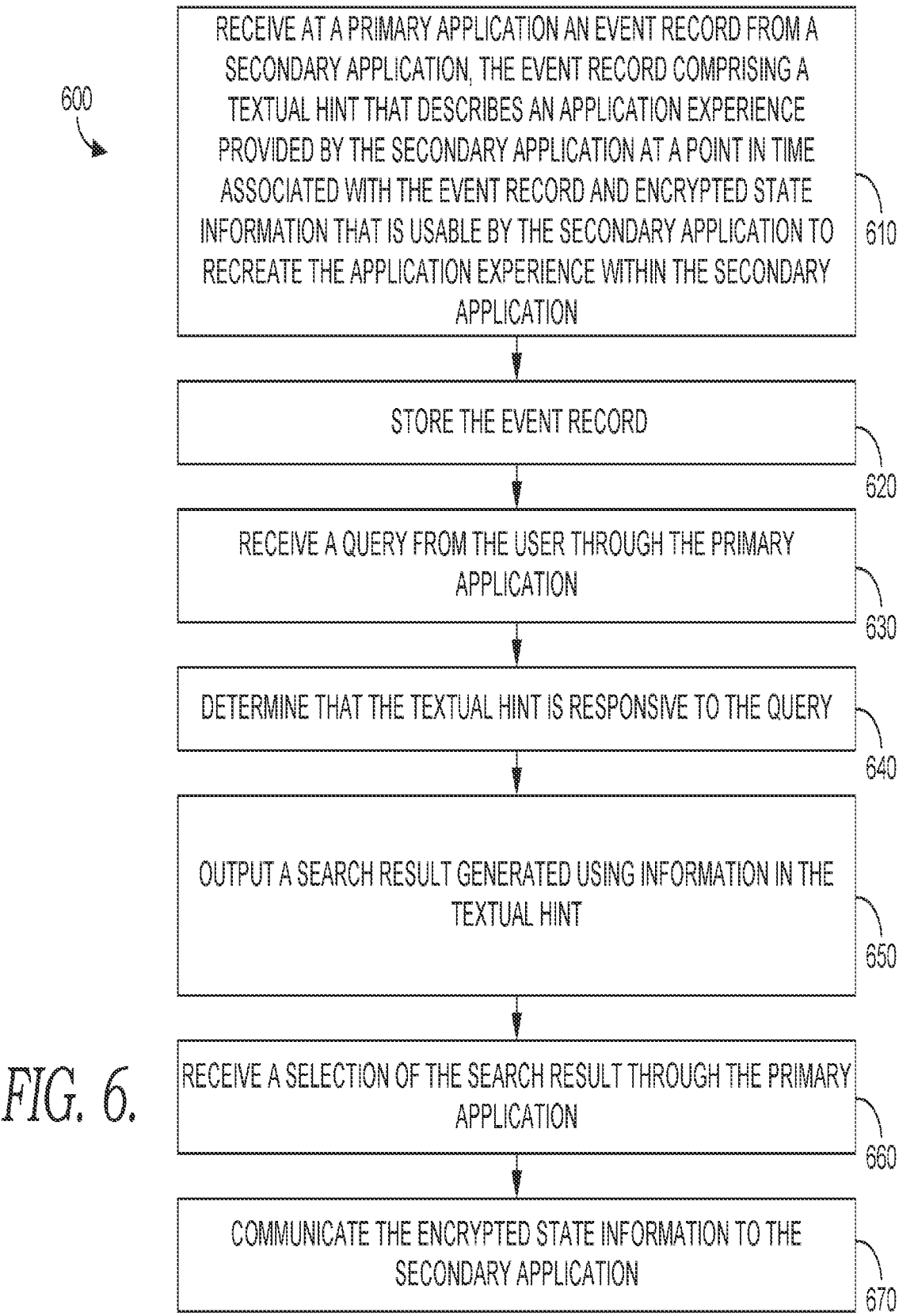
FIGS. 6-8 depict a flow diagrams of a methods for sharing application state across applications, services, or devices, in accordance with aspects of the present disclosure.

Turning now to FIG. 6, a method 600 of state-enabled navigation between applications is provided. Method 600 may be performed by a primary application, such as a virtual personal assistant. A secondary application may be installed on a user device. A secondary application may also be a service provided by a remote computing resource.

At step 610, an event record from a secondary application is received at a primary application. The event record comprises a textual hint that describes an application experience provided by the secondary application at a point in time associated the event record and encrypted state information that is usable by the secondary application to recreate the application experience within the secondary application. The event record memorializes an application experience in a way the application experience can be understood by other applications and used by the application creating the event record to recreate the application experience. The event record can include a non-encrypted event description that is consumable by the primary application to understand the application experience. The event record can also include encrypted state information that is not consumable by the primary application, but can be returned to the secondary application by the primary application and consumed by the secondary application in order to recreate an application experience consistent with the event.

The event description can include a hint and an image of a secondary application's user interface at a point in time associated with the event. The hint can be a group of keywords, snippets taken from the second application's user interface, or other information that describes event. The hint or information extracted from the hint can be added to an index that allows the primary application to determine that the event is relevant to a subsequent user action. The index record can also include information identifying the application from which the event record was received and other contextual information about the state of the user or the user's device when the event record was created. The image can be a thumbnail of the secondary application's user interface.

At step 620, the event record is stored. The event record may be stored in a user profile associated with the user, such as in application event data component 242 of user profile 240 in storage 225. Alternatively or in additional, event data may be stored locally on a client user device 250 in location storage 255. Primary application 256 may access API layer 258 to facilitate formatting, transferring, and/or storing or retrieving event data to or from a data store, such as application event data 242 or user profile 240 in storage 225. In one aspect, a hint from the event record in included a searchable index that is used to determine when an application experience associated with the event record is relevant to the user.

At step 630, a query is received from the user through the primary application. The query may be entered in a search input box, verbally communicated to the primary application without a search interface evening being present, or in some other context.

At step 640, the textual hint is determined to be responsive to the query. The responsiveness can be determined via keyword matching and using other methods of finding and ranking search results by relevance to the user query. The context of the device at the time of the query as well as user characteristics, including application usage patterns, can be consumed to determine responsiveness.

At step 650, a search result generated using information in the event record is output. The generation of a search result has been described previously with reference to FIG. 4.

At step 660, a selection of the search result is received through the primary application.

At step 670, the encrypted state information is communicated to the secondary application. The method can further comprise opening an instance of the secondary application prior to communicating the state information, if the secondary application is not running when the selection of step 860 is received.

Figure 7:
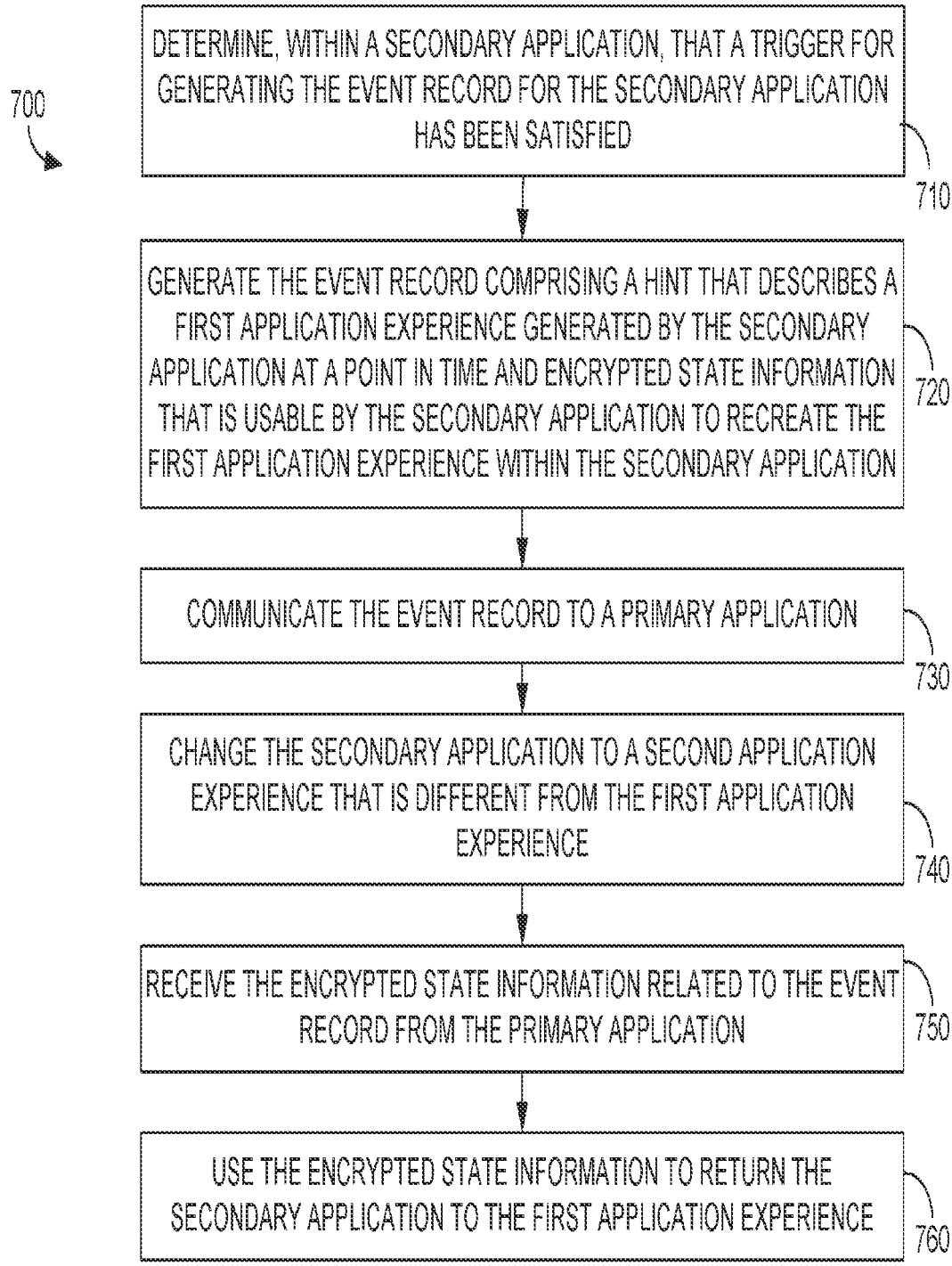

Turning now to FIG. 7, a method 700 of communicating event records from a secondary application to a primary application is provided. Method 700 may be performed by a secondary application installed on a user device. A secondary application may also be a service provided by a remote computing resource.

At step 710, a determination is made within a secondary application that a trigger for generating an event record has been satisfied. The circumstances that trigger creation of an event record can be defined by a trigger criterion for the event. When the trigger criterion is met, the event record is created. Exemplary events include closing an application, completing a task, entering new data, displaying an updated user interface, and such. The trigger criteria allow a computing device to determine the event happened or is about to. For example, the trigger criteria for the "close application event" can be receiving an instruction to close the application. In this situation, the event record would be created and communicated to the primary application before the secondary application is closed.

At step 720, the event record is generated by the secondary application. The event record comprises a hint that describes a first application experience generated by the secondary application at a point in time and encrypted state information that is usable by the secondary application to recreate the first application experience within the secondary application.

The event record memorializes an application experience in a way the application experience can be understood by other applications and used by the application creating the event record to recreate the application experience. The event record can include a non-encrypted event description that is consumable by the primary application to understand the application experience. The event record can also include encrypted state information that is not consumable by the primary application, but can be returned to the secondary application by the primary application and consumed by the secondary application in order to recreate an application experience consistent with the event.

The event description can include a hint and an image of a secondary application's user interface at a point in time associated with the event. The hint can be a group of keywords, snippets taken from the second application's user interface, or other information that describes event. The hint or information extracted from the hint can be added to an index that allows the primary application to determine that the event is relevant to a subsequent user action. The index record can also include information identifying the application from which the event record was received and other contextual information about the state of the user or the user's device when the event record was created. The image can be a thumbnail of the secondary application's user interface.

At step 730, the event record is communicated to a primary application. As described previously, the event record may be communicated via an API or some other mechanism.

At step 740, the secondary application is changed to a second application experience that is different from the first application experience. The secondary application can be changed in response to additional user input. Taking the travel application as an example, new flight parameters could have been provided.

At step 750, the encrypted state information is received from the primary application. The encrypted state information may then be decrypted using a key the secondary application used to encrypt the state information in the first place.

At step 760, the encrypted state information is used to return the secondary application to the first application experience. As part of this process, dependent data that forms part of the first application experience may be refreshed. Accordingly, the first application experience can comprise both independent data shown previously and dependent data that has been updated.

Figure 8:
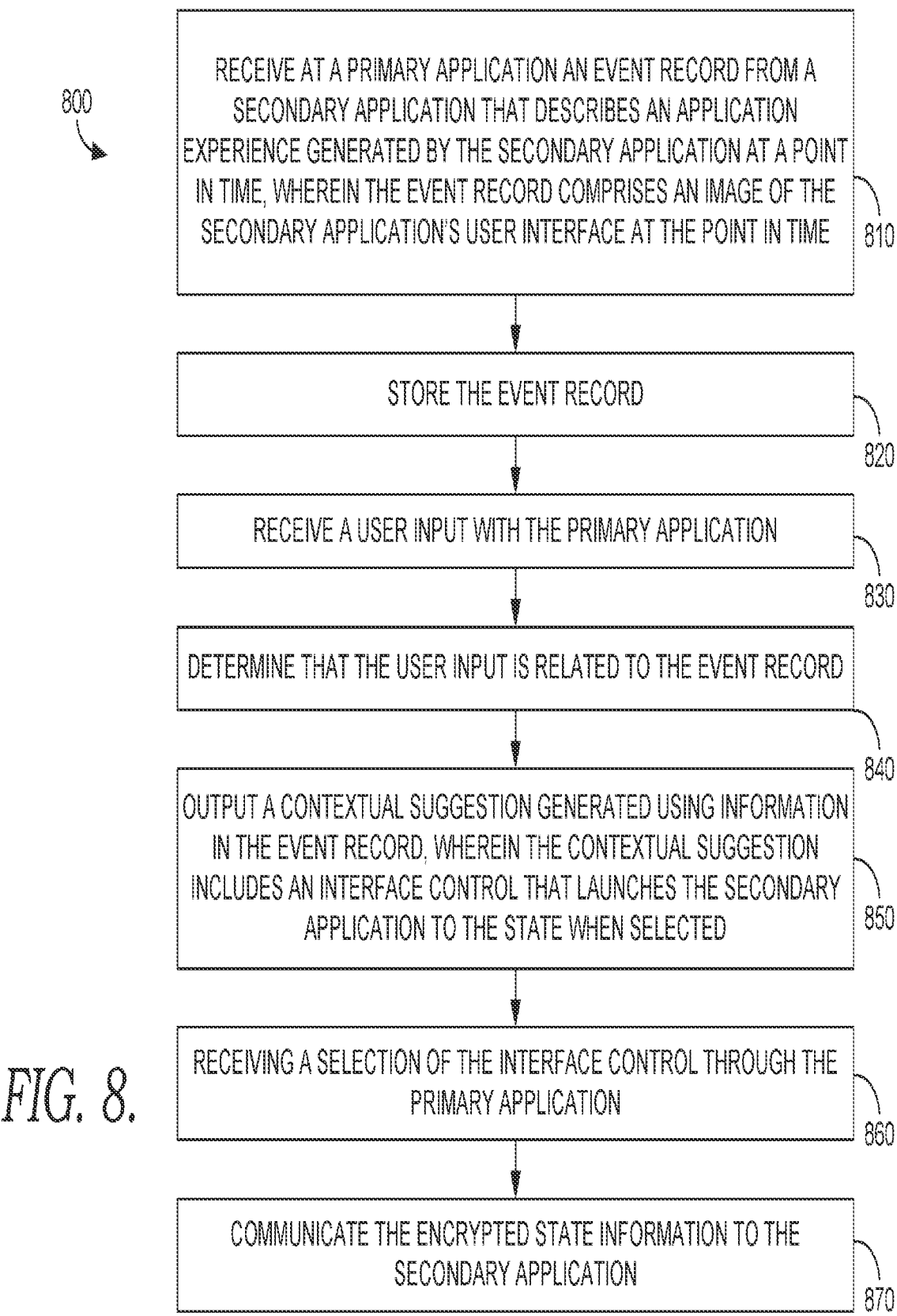

Turning now to FIG. 8, a method 800 of state-enabled navigation between applications is provided. Method 800 may be performed by a primary application, such as a virtual personal assistant. A secondary application may be installed on a user device. A secondary application may also be a service provided by a remote computing resource.

At step 810, an event record is received at a primary application from a secondary application that describes an application experience generated by the secondary application at a point in time. The event record comprises an image of the secondary application's user interface at the point in time. The event record memorializes an application experience in a way the application experience can be understood by other applications and used by the application creating the event record to recreate the application experience. The event record can include a non-encrypted event description that is consumable by the primary application to understand the application experience. The event record can also include encrypted state information that is not consumable by the primary application, but can be returned to the secondary application by the primary application and consumed by the secondary application in order to recreate an application experience consistent with the event.

The event description can include a hint and an image of a secondary application's user interface at a point in time associated with the event. The hint can be a group of keywords, snippets taken from the second application's user interface, or other information that describes event. The hint or information extracted from the hint can be added to an index that allows the primary application to determine that the event is relevant to a subsequent user action. The index record can also include information identifying the application from which the event record was received and other contextual information about the state of the user or the user's device when the event record was created. The image can be a thumbnail of the secondary application's user interface.

At step 820, the event record is stored. The event record may be stored in a user profile associated with the user, such as in application event data component 242 of user profile 240 in storage 225. Alternatively or in additional, event data may be stored locally on a client user device 250 in location storage 255. Primary application 256 may access API layer 258 to facilitate formatting, transferring, and/or storing or retrieving event data to or from a data store, such as application event data 242 or user profile 240 in storage 225. In one aspect, a hint from the event record in included a searchable index that is used to determine when an application experience associated with the event record is relevant to the user.

At step 830, a user input is received through the primary application. The user input could be a request for help performing a task. For example, the user could ask a virtual personal assistant to help make reservations or perform some other task the user typically uses a secondary application to complete. In determining the best way to help the user, the personal assistant could search event records or some other data storage, such as an index, to determine if application experiences relevant to the input exist.

At step 840, a determination is made that the user input is related to the event record.

At step 850, a contextual suggestion generated using information in the event record is output. The contextual suggestion includes an interface control that launches the secondary application to the application experience when selected. The contextual suggestion can identify the secondary application and provide a description of the application experience. The hint and image of the application experience can be used to generate the contextual suggestion.

At step 860, a selection of the interface control through the primary application is received. The selection could be verbal, manual, or though some other input mechanism.

At step 870, the encrypted state information is communicated to the secondary application. The secondary application then uses the encrypted state information to recreate the experience. The method can further comprise opening an instance of the secondary application prior to communicating the state information, if the secondary application is not running when the selection of step 860 is received.

Figure 9:
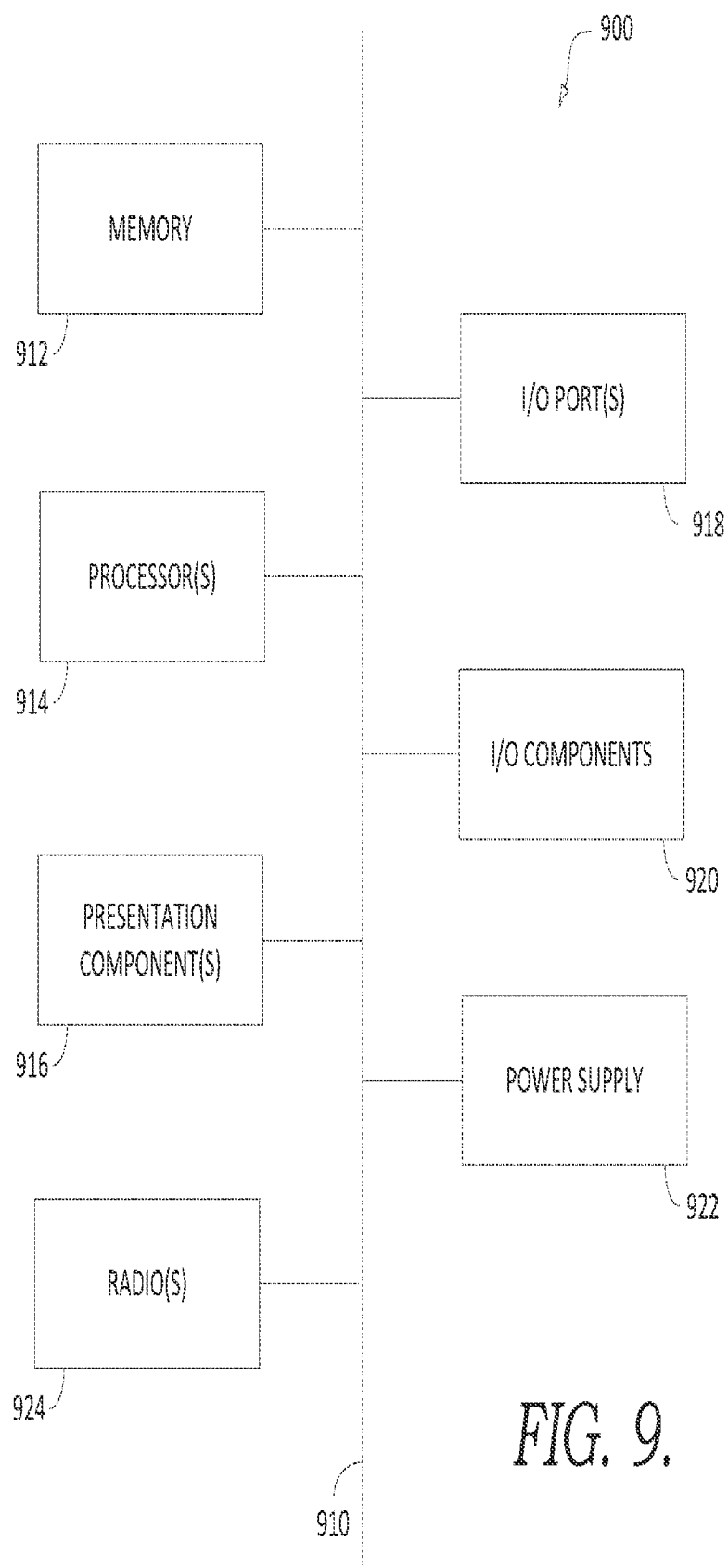
FIG. 9 is a block diagram of an exemplary computing environment suitable for use in implementing an aspect of the present disclosure.

Having described various implementations, an exemplary computing environment suitable for implementing aspects of the disclosure is now described. With reference to FIG. 9, an exemplary computing device is provided and referred to generally as computing device 900. The computing device 900 is but one example of a suitable computing environment and is not intended to suggest any limitation as to the scope of use or functionality of aspects of the disclosure. Neither should the computing device 900 be interpreted as having any dependency or requirement relating to any one or combination of components illustrated.

Aspects of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Aspects of the disclosure may be practiced in a variety of system configurations, including handheld devices, consumer electronics, general-purpose computers, more specialty computing devices, etc. Aspects of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 9, computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. Bus 910 represents what may be one or more busses (such as an address bus, data bus, or combination thereof). Although the various blocks of FIG. 9 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more aspects of the present disclosure. Distinction is not made between such categories as "workstation," "server,"

"laptop," "handheld device," etc., as all are contemplated within the scope of FIG. 9 and with reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors 914 that read data from various entities such as memory 912 or I/O components 920. Presentation component(s) 916 presents data indications to a user or other device. Exemplary presentation components include a display device, speaker, printing component, vibrating component, and the like.

The I/O ports 918 allow computing device 900 to be logically coupled to other devices, including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

Some aspects of computing device 900 may include one or more radio(s) 924 (or similar wireless communication components). The radio 924 transmits and receives radio or wireless communications. The computing device 900 may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the disclosure have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method of state-enabled navigation between applications comprising:
   receiving, at a first secondary application, an event record from a second secondary application, the event record comprising:
      an unencrypted textual hint that describes an application experience that the second secondary application provided at a point in time associated with the event record; and
      encrypted state information that is usable by the second secondary application to recreate the application experience, wherein the first secondary application does not have access to a decryption key that allows the encrypted state information to be decrypted;
   storing the event record;
   receiving a query through the first secondary application;
   determining that the unencrypted textual hint is responsive to the query;
   outputting a search result generated using information in the unencrypted textual hint;

receiving a selection of the search result through the first secondary application; and communicating the encrypted state information from the first secondary application to the second secondary application to recreate the application experience.

2. The method of claim 1, wherein the event record comprises an image of a user interface of the second secondary application at the point in time associated with an event, and wherein the search result includes the image.

3. The method of claim 2, wherein the unencrypted textual hint comprises keywords extracted from the application experience at the point in time.

4. The method of claim 2, wherein the unencrypted textual hint comprises contextual information about a user device on which the application experience is displayed at the point in time.

5. The method of claim 1, wherein storing the event record comprises storing a portion of the event record prior to completion of the event record.

6. The method of claim 1, wherein the encrypted state information includes data entered by a user into the second secondary application and used by the second secondary application to generate the application experience.

7. The method of claim 1, wherein the unencrypted textual hint follows a taxonomy of knowledge that can be added to a contextual knowledge base about a user of a user device on which the second secondary application is running.

8. One or more computer storage media having computer-executable instructions embodied thereon, which, when executed by a computing device, cause the computing device to perform a method of communicating event records from a first secondary application to a second secondary application, the method comprising:
   generating an event record for the first secondary application, the event record comprising:
      an unencrypted textual hint that describes a first application experience generated by the first secondary application at a point in time; and
      encrypted state information that is usable by the first secondary application to recreate the first application experience;
   communicating the event record to the second secondary application, wherein the second secondary application does not have access to a decryption key that allows the encrypted state information to be decrypted;
   changing the second secondary application to a second application experience that is different from the first application experience;
   receiving the encrypted state information from the first secondary application; and
   using the encrypted state information to change the second application experience of the second secondary application to the first application experience.

9. The media of claim 8, wherein the event record comprises a trusted application identification.

10. The media of claim 8, wherein the unencrypted textual hint is built using keywords taken from input provided by a user to the first secondary application and used by the first secondary application to generate the first application experience.

11. The media of claim 8, wherein communicating the event record to the second secondary application comprises communicating independent data and dependent data, wherein the dependent data updates upon the change of the second application experience to the first application experience.

12. The media of claim 11, wherein the method further comprises displaying, via an interface, the independent data and the dependent data that was updated.

13. The media of claim 8, further comprising:
   prior to generating the event record, determining, within the first secondary application, that a trigger for generating the event record has been satisfied, wherein the trigger comprises receiving an instruction to hide an interface associated with the first secondary application; and
   generating the event record.

14. The media of claim 8, further comprising:
   prior to generating the event record, determining, within the first secondary application, that a trigger for generating the event record has been satisfied, wherein the trigger comprises receiving a user input in the first secondary application; and
   generating the event record.

15. The media of claim 8, wherein the event record is communicated through an application program interface to the second secondary application.

16. A system for state-enabled navigation between applications, the system comprising:
   one or more processors; and
   computer memory storing computer-usable instructions that perform operations when the instructions are executed by the one or more processors, the operations comprising:
      receive, at a first secondary application, an event record from a second secondary application, wherein the event record describes an application experience generated by the second secondary application at a point in time, wherein the event record further comprises:
         encrypted state information that is usable by the second secondary application to recreate the application experience; and
         an unencrypted textual hint that describes the application experience;
      store the event record;
      receive a user input through the first secondary application;
      determine that the user input is related to the event record;
      output a contextual suggestion generated using information in the event record, wherein the contextual suggestion includes an interface control that launches the first secondary application to the application experience when selected;
      receive a selection of the interface control; and
      based on the selection, communicate the encrypted state information to the first secondary application.

17. The system of claim 16, wherein the unencrypted textual hint follows a taxonomy of knowledge for a contextual knowledge base that stores information about a user of a user device on which the second secondary application is running.

18. The system of claim 16, wherein an event associated with the event record is the second secondary application closing.

19. The system of claim 16, wherein an event associated with the event record is a user inputting data into the second secondary application.

20. The system of claim 16, wherein an event associated with the event record is the second secondary application completing an action for a user.

* * * * *